United States Patent
Gupta et al.

(10) Patent No.: US 11,922,378 B2
(45) Date of Patent: Mar. 5, 2024

(54) MACHINE LEARNING BASED VEHICLE SERVICE RECOMMENDATION SYSTEM

(71) Applicant: Tekion Corp, Pleasanton, CA (US)

(72) Inventors: Nitika Gupta, Bengaluru (IN); Ved Surtani, Bengaluru (IN); Justin Alexander Chi-Young Hou, Pleasanton, CA (US)

(73) Assignee: Tekion Corp, Pleasanton, CA (US)

( * ) Notice: Subject to any disclaimer, the term of this patent is extended or adjusted under 35 U.S.C. 154(b) by 0 days.

(21) Appl. No.: 17/547,617

(22) Filed: Dec. 10, 2021

(65) Prior Publication Data
US 2023/0186250 A1    Jun. 15, 2023

(51) Int. Cl.
G06Q 10/20    (2023.01)
G06N 20/00    (2019.01)

(52) U.S. Cl.
CPC ............ *G06Q 10/20* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,657,233 A * | 8/1997 | Cherrington | G01M 17/007 |
| | | | 702/170 |
| 9,536,254 B1 * | 1/2017 | David | G07C 5/008 |
| 10,559,387 B2 * | 2/2020 | Althoff | G16H 30/20 |
| 10,769,538 B1 * | 9/2020 | Merritt | G06N 5/01 |
| 2013/0218687 A1 * | 8/2013 | Sohangir | G06F 16/9535 |
| | | | 705/14.66 |
| 2013/0317694 A1 * | 11/2013 | Merg | G07C 5/008 |
| | | | 701/31.6 |

(Continued)

FOREIGN PATENT DOCUMENTS

| | | | |
|---|---|---|---|
| EP | 3336779 A1 * | 6/2017 | G06Q 10/06 |
| EP | 3260943 A1 * | 11/2017 | G05B 23/02 |

(Continued)

OTHER PUBLICATIONS

Thyago P. Carvalho, Fabrizzio A. A. M. N. Soares, Roberto Vita, Roberto da P. Francisco, João P. Basto, Symone G. S. Alcalá, A systematic literature review of machine learning methods applied to predictive maintenance, Computers & Industrial Engineering, vol. 137, 2019, 106024, ISSN 0360-8352 (Year: 2019).*

(Continued)

*Primary Examiner* — Paul R Fisher
(74) *Attorney, Agent, or Firm* — Fenwick & West LLP

(57) ABSTRACT

A device receives current vehicle data that describes a current state of each of a plurality of components of the vehicle. The device accesses historical data describing prior services previously performed on the vehicle and applies the current vehicle data and the historical vehicle data to a trained machine learning model to obtain a set of recommended services, where the model was trained using labeled training data associated with additional vehicles having a threshold similarity to the vehicle. The machine learning model is trained to output a set of recommended services to be performed for a given vehicle based on inputs of given current vehicle data and given historical vehicle data for the given vehicle. The device outputs for display the set of recommended services to be performed on the vehicle to a user.

19 Claims, 7 Drawing Sheets

(56) References Cited

U.S. PATENT DOCUMENTS

| | | | | |
|---|---|---|---|---|
| 2015/0170175 A1* | 6/2015 | Zhang | ................ | H04M 15/851 |
| | | | | 705/7.33 |
| 2015/0220999 A1* | 8/2015 | Thornton | ............ | H04M 15/805 |
| | | | | 705/14.66 |
| 2016/0035150 A1* | 2/2016 | Barfield, Jr. | ....... | G05B 23/0254 |
| | | | | 701/29.3 |
| 2016/0104123 A1* | 4/2016 | Viswanath | ............ | G06F 16/245 |
| | | | | 705/305 |
| 2017/0166328 A1* | 6/2017 | Ethington | ............... | G06Q 10/20 |
| 2017/0322705 A1* | 11/2017 | Conway | .............. | G06F 3/04842 |
| 2018/0293664 A1* | 10/2018 | Zhang | .................... | G06V 10/25 |
| 2019/0197798 A1* | 6/2019 | Abari | ..................... | G06N 20/00 |
| 2019/0236510 A1* | 8/2019 | Kwak | .................. | G07C 5/0841 |
| 2020/0005153 A1* | 1/2020 | Ramanath | ............. | G06F 16/285 |
| 2020/0020038 A1* | 1/2020 | Haile | ..................... | G16H 50/30 |
| 2020/0279229 A1 | 9/2020 | Viswanath et al. | | |
| 2020/0406906 A1* | 12/2020 | Omari | ................... | B60W 50/0098 |
| 2021/0049444 A1* | 2/2021 | Bielby | ................... | G06N 3/088 |
| 2021/0049445 A1* | 2/2021 | Bielby | ................... | G06N 3/049 |
| 2021/0049480 A1* | 2/2021 | Kale | ..................... | G06N 3/049 |
| 2021/0374500 A1* | 12/2021 | Ghosh | ................... | G06Q 10/20 |
| 2022/0027963 A1* | 1/2022 | Isaac | ..................... | G07C 5/0808 |

FOREIGN PATENT DOCUMENTS

| | | | | |
|---|---|---|---|---|
| JP | 2019-194744 A | 11/2019 | | |
| KR | 10-2021-0149514 A | 12/2021 | | |
| WO | WO0184506 A1 * | 11/2001 | ................ | G07C 5/00 |
| WO | WO2016166708 A1 * | 10/2016 | ............. | G06Q 30/06 |
| WO | WO20180130905 A1 * | 7/2018 | ............. | G06Q 10/00 |
| WO | WO2019177511 A1 * | 9/2019 | ............. | G05D 1/02 |
| WO | WO 2019-185659 A1 | 10/2019 | | |
| WO | WO2020112337 A1 * | 6/2020 | ............. | G05B 23/00 |
| WO | WO2020191225 A1 * | 9/2020 | ............. | G06Q 10/06 |

OTHER PUBLICATIONS

Angelopoulos A, Michailidis ET, Nomikos N, Trakadas P, Hatziefremidis A, Voliotis S, Zahariadis T. Tackling Faults in the Industry 4.0 Era—A Survey of Machine-Learning Solutions and Key Aspects. Sensors. 2020; 20(1):109. https://doi.org/10.3390/s20010109 (Year: 2020).*

Chen, Ting, et al. "Big self-supervised models are strong semi-supervised learners." Advances in neural information processing systems 33 (2020): 22243-22255. (Year: 2020).*

International Search Report and Written Opinion, Patent Cooperation Treaty Application No. PCT/US2022/049361, dated Mar. 28, 2023, 8 pages.

* cited by examiner

320

Vehicle Service Recommendations

Customer Name:_____
Make/Model/Year:_____
Date of Service:_____

322

Filters ⌄

Advanced Filters    324

| Service | Severity | Price | Time for Completion |
|---------|----------|-------|---------------------|
| Engine  |          | $$$   | 10 hrs              |
| Oil     |          | $     | 2.5 hrs             |
| Tires   |          | $$    | 15 hrs              |
| Lights  |          | $     | 0.5 hrs             |

Vehicle Service Recommendations

Customer Name:_____
Make/Model/Year:_____
Date of Service:_____

332
( Budget: $800 )  ( Time: 12 Hours )  ( Returning Customer )
Reset Filters
334

| Service | Severity | Price | Time for Completion |
|---------|----------|-------|---------------------|
| Engine  |          | $$$   | 10 hrs              |
| Oil     |          | $     | 2.5 hrs             |
| Lights  |          | $     | 0.5 hrs             |

Vehicle Service Recommendations

Customer Name:_____
Make/Model/Year:_____
Date of Service:_____

( Budget: $800 )  ( Time: 12 Hours )  ( Returning Customer )

Reset Filters

| Service | Severity | Price | Time for Completion |
|---|---|---|---|
| 342 Engine | | $$$ | 10 hrs |
| Lights | | $ | 0.5 hrs |
| Oil | | $ | 2.5 hrs |

MACHINE LEARNING BASED VEHICLE SERVICE RECOMMENDATION SYSTEM

TECHNICAL FIELD

This disclosure generally relates to the field of machine learning, and more particularly relates to training and use of a machine learning model to drive an improved recommendation engine for vehicle services.

BACKGROUND

Vehicle services today are driven through inaccurate manual processes. When a driver takes a vehicle in for services, a technician inspects the vehicle, marks the state of various components, and makes a judgment call on services to provide to a customer. This manual process is prone to inaccuracies, as a junior technician may be unaware of potential services or signs of poor component health. Automating the process is prone to the same inaccuracies, as inputs to any automation mechanism would be driven by human inspections and input of data through heuristics. Moreover, present means of informing users about potential services are manual transmissions of information that are not informed by prior decisions. Thus, as users select and decline services, future recommendations are not provided on the basis of prior decisions, thus causing users to get flooded with recommendations of undesirable services and these undesirable service recommendations may obscure desirable service recommendations.

SUMMARY

Systems and methods are disclosed herein for an improved mechanism for automating vehicle service recommendations using machine learning. A service recommendation system profiles a vehicle driver and a vehicle itself by collecting historical data about the driver and the vehicle. Historical data is collected across a fleet of vehicles and vehicle drivers and aggregated as well. The recommendation system receives input from a technician including the states of various inspected components, and may augment this input with hardware-sourced input by querying sensor data from a database associated with a current state of the vehicle, and/or by querying sensors of the vehicle directly.

The historical data and the received input are applied to a machine learning model, which outputs data indicating services that would benefit the vehicle. The machine learning model may be trained with at least some of the historical data collected across the fleet of vehicles and vehicle drivers. The output data is used to generate recommendations to a user through a user interface. The user interface may be optimized based on prior application usage of the recommendation engine to configure icons within the user interface. Exemplary advantages of the service recommendation system include an improved user interface that allocates placement of icons based on application usage. Exemplary advantages may also include a machine learning model trained to efficiently optimize recommendations based on robust historical vehicle data, where the machine learning model is re-trained as a user interacts with the user interface, thus improving accuracy of the machine learning model and icon placement within the user interface over time. Further advantages will be apparent based on the below disclosure.

Embodiments of the instant disclosure relate to systems and methods for generating recommended services for a vehicle. A management system may receive, via a user interface of a user device, current vehicle data associated with the vehicle data describing a current state of the vehicle. In some embodiments, the current vehicle data includes inspection information provided by a technician of the vehicle. In addition, current data may be received directly from one or more sensors of the vehicle, a computer of the vehicle, or the like.

The management system accesses historical vehicle data associated with the vehicle describing a set of services previously performed on the vehicle. In some embodiments, the historical vehicle data are classified into a plurality of predetermined service classifications, wherein the set of recommended services includes services corresponding to the predetermined service classifications. The management system applies the current vehicle data and the historical vehicle data to a trained machine learning model configured to generate a set of recommended services to be performed on the vehicle. The trained machine learning model may be trained by accessing labeled training data associated with additional vehicles having a threshold similarity to the vehicle, each label indicating a set of services performed on a respective additional vehicle. In some embodiments, the training data includes at least one of a historical inspection information of the additional vehicles, inspection values of the additional vehicles, services performed on the additional vehicles, or services declined by customers of the additional vehicles. The trained machine learning model may optionally be trained by applying the labeled training data to the machine learning model to generate a set of recommended services for each of the additional vehicles. The machine learning model may be updated based on the sets of recommended services and the labels indicating the set of services actually performed on the additional vehicles. In some embodiments, user profile data associated with an owner of the vehicle is accessed. In these embodiments, applying the current vehicle data and the historical vehicle data to the trained machine learning model further includes applying the user profile data to the trained machine learning model.

The set of recommended services to be performed on the vehicle are provided on the user interface of the user device. The set of recommended services may be filtered based on at least one of: a value parameter indicated by an owner of the vehicle, a severity of service of each of the recommended services in the set of recommended services, and/or a likelihood the owner of the vehicle will accept a recommended service. In these embodiments, the filtered set of recommended services are provided for display. In some embodiments, the set of recommended services is filtered based on a set of services a service provider offers to vehicle owners.

In some embodiments, the set of recommended services to be performed on the vehicle are ranked. In these embodiments, selectable options are provided for display. Each selectable option is associated with a recommended service in the set of recommended services. Further, it may be determined that a user has interacted with a selectable option corresponding to a recommended service. Responsive to determining that the user has interacted with the selectable option, a subset of the selectable options may be reranked, where the user interface is updated based on the reranking, the updated user interface including a selectable option for each of a subset of the selectable options, and updated user interface is provided for display.

In some embodiments, one or more interface elements are provided on the user interface of the user device. Each of the one or more interface elements allows a user select one or more values associated with car services. In these embodiments, in response to receiving an indication that a user interacted with at least one interface element of the one or more interface elements, the set of recommended services to be performed on the vehicle are optimized. Further, the user interface may be updated based on the optimized set of recommended services.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of an exemplary system environment for implementing a service recommendation system.

FIG. 3B illustrates one embodiment of a user interface that shows an output of the service recommendation system.

FIG. 3C illustrates one embodiment of a user interface shows a filtered output of the service recommendation system.

FIG. 3D illustrates one embodiment of a user interface shows an icon selected from a filtered output of the service recommendation system.

FIG.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Service Recommendation System Environment

Figure 1:
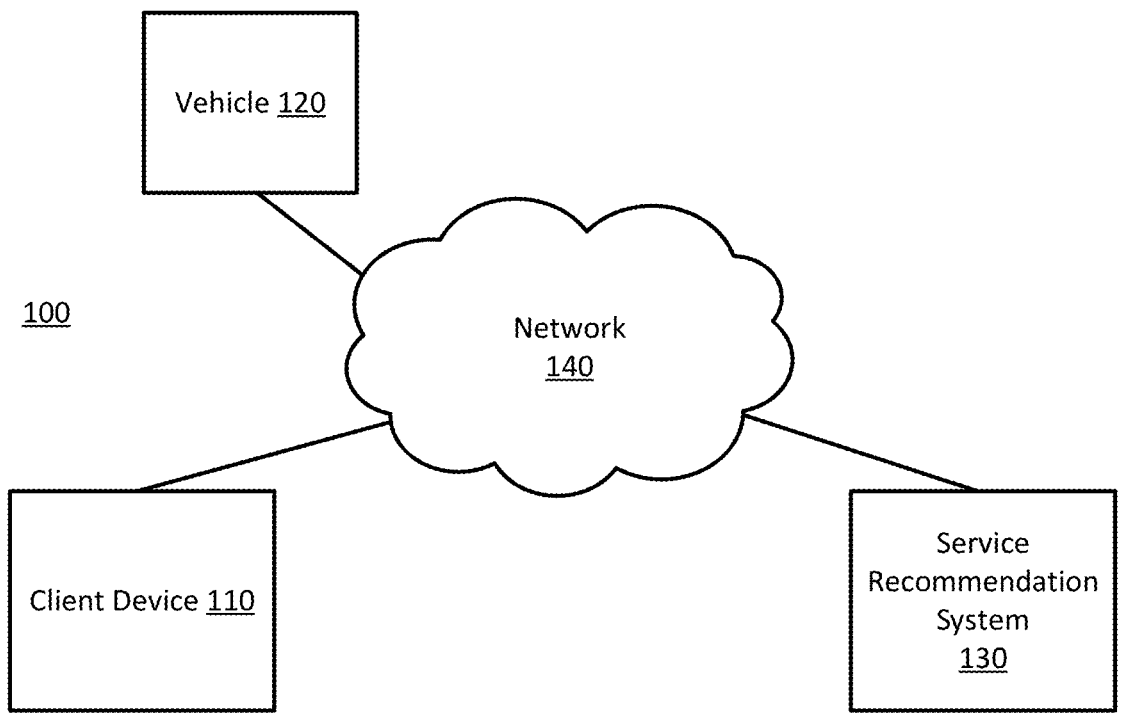

FIG. 1 illustrates one embodiment of an exemplary system environment for implementing a service recommendation system. As depicted in FIG. 1, environment 100 includes client device 110, network 120, and service recommendation system system 130. Client device 110 may be any client device, such as a mobile phone, laptop, personal computer, kiosk, and/or any other device having a user interface that displays data to a user, accepts input from a user, and is configurable to communicate with service recommendation system 130 and/or vehicle 120. While only one client device 110 is depicted, any number of client devices may be present in environment 100 (e.g., a client device of a vehicle driver and another one of a service technician). Network 140 may be any network, such as the Internet, WiFi, local area network, wide area network, a direct connection (e.g., a cable or port attachment directly between client device 110 and a computing device of vehicle 120) and so on, that enables data communications between user device 110, vehicle 120, and/or service recommendation system 130. Vehicle 120 may have one or more computing devices (e.g., central computing device, computing devices that operate various sensors, communications devices, and so on) that may be operably coupled to network 140 to communicate information about components of vehicle 120. Vehicle 120 may be any type of vehicle, such as a car, a motorcycle, a truck, a scooter, a moped, and any other form of transit. Further particulars of service recommendation system 130 are disclosed below with respect to FIG. 2.

Figure 2:
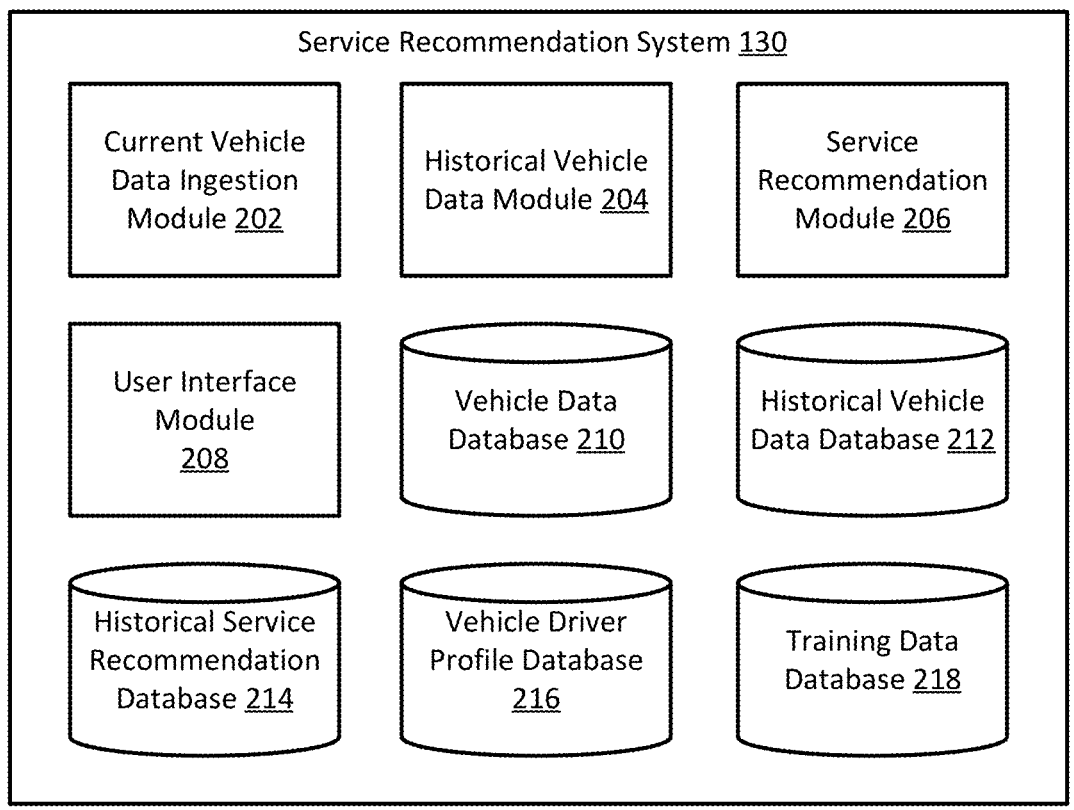
FIG. 2 illustrates one embodiment of exemplary modules and databases for implementation of the service recommendation system.

FIG. 2 illustrates one embodiment of exemplary modules and databases for implementation of the service recommendation system. As depicted in FIG. 2, service recommendation 130 includes current vehicle data ingestion module 202, historical vehicle data module 204, service recommendation module 206, user interface module 208, vehicle data database 210, historical vehicle data database 212, historical service recommendation database 214, customer database 216, and training data database 218. The modules and databases depicted with respect to FIG. 2 are merely exemplary; fewer or additional modules and/or databases may be used to achieve the functionality disclosed herein. Moreover, while service recommendation system 130 is depicted as a single entity, functionality of service recommendation system 130 may be distributed over multiple computing devices that communicate using network 140.

Current vehicle data ingestion module 202 receives current vehicle data associated with a vehicle. Current vehicle data may be gathered manually, automatically, or a combination thereof. Manual gathering of current vehicle data may be performed by a service technician, who may inspect, visually and/or with the use of one or more sensors, the status of each of a plurality of components of a vehicle, such as brake depth, tire wear, oil status, and any other feature of a vehicle. Client device 110 may receive user input from the technician that specifies the status of each inspected component. Additionally or alternatively, client device 110 may have one or more application protocol interfaces (APIs) configured to receive data from sensors used during the inspection (e.g., a brake depth sensor) and automatically populate status based on the received sensor data (e.g., populate brake depth, or a categorization thereof (e.g., depth is OK or depth is low). Automatic gathering of vehicle data may be performed by operably coupling client device 110 to one or more computers of vehicle 120, where an API may be used by client device 110 to query one or more databases and or sensors of vehicle 120 to provide status information of some or all components of vehicle 120. Client device 110 may then populate the status based on the received information. In performing the aforementioned operations, client device 110 may execute an application provided by service recommendation service 130, where the application generates the user interface for receiving user input and populates inspection data as it is received. The application may communicate the inspection information to service recommendation system 130 for processing.

Historical vehicle data module 204 identifies historical data of vehicles. The historical vehicle data may describe a set of services previously performed on the vehicle that is presently being inspected. Historical vehicle data module 204 may identify the historical data by accessing a database (e.g., historical vehicle data database 212) that stores data relating to prior performed services. The database may be populated manually (e.g., where a service technician enters data of a service that the technician performed) and/or automatically. Automatic population may occur responsive to historical vehicle data module 204 detecting an activity associated with a service. For example, where client device 110 presents a service on a user interface, and the service is selected (e.g., as depicted in FIG. 3D, discussed further below in this disclosure), automatic population of that service may occur in historical vehicle data database 212. As another example, historical vehicle data module 204 may search an external database (e.g., periodically or according to a time schedule) with a vehicle identifier (e.g., VIN number) for logged activity (e.g., a part was ordered from a factory), and may populate that information into historical vehicle data database 212.

Service recommendation module 206 generates a set of recommended services to be performed on the vehicle. To do so, service recommendation module 206 applies the current vehicle data and the historical vehicle data as input to a trained machine learning model. The machine learning model may include one or more of a neural network, a deep learning model, a convolutional neural network, and any other form of supervised learning model. The machine learning model may be generic, may be determined from a plurality of machine learning models that are each trained to accurately output recommended services for different types of vehicles, or may be trained specifically for the current vehicle using training data from similar vehicles.

The machine learning model may be trained using training data having vehicle attributes as paired to one or more labels of recommended services for those attributes. The vehicle attributes may include biographical information about the vehicle (e.g., make, model, color, components of base package, add-on components on top of the base package, vehicle classification (e.g., SUV, sedan, etc.), and so on). The vehicle attributes may also include status information (e.g., information about component health). The label(s) may indicate one or more services that should be performed when the combination of vehicle attributes of a given entry of training data are encountered.

The training data may be generated manually (e.g., by an expert inspector reviewing combinations of vehicle attributes and applying labels for services that should be performed). The training data may be generated automatically (e.g., by obtaining historical service performance information from an electronic database and applying the services performed as labels to the underlying vehicle attributes of the vehicle on which service was performed).

The training data may be supplemented over time, where, as service recommendation module 206 outputs service recommendations and services are selected therefrom, service recommendation module 206 may label the vehicle attributes ingested by current vehicle data ingestion module 202 with the selected services and add these attribute-label pairs to training data database 218. Similarly, where service recommendation module 206 outputs service recommendations that are not adopted, labels may be applied to the collection of attributes that indicate that the attributes are not associated with the rejected service recommendation. Discounts may be applied to the training data. For example, rejected service labels may be discounted relative to accepted service labels, because services may be rejected for reasons other than the service is not warranted given the vehicle condition (e.g., the driver does not have time to be without their car for the duration of a lengthy service). Older training data may be discounted relative to newer training data.

In an embodiment, machine learning models may be trained for different types of vehicles. A different type of vehicle may be a sports utility vehicle (SUV) versus a sedan versus a pick-up-truck, for example. Vehicle types may be categorized based on whether a vehicle has a certain type of component (e.g., V6 engine versus V8 engine). Vehicle types may be categorized on any basis input by an administrator into service recommendations system 130. Service recommendation module 206 may train different machine learning models for each type by using segments of the training data from training data database 218 that conforms to the vehicle type definition. For example, if a vehicle type definition is SUV, then service recommendation module 206 may train the model using training data for SUVs.

In an embodiment, service recommendation module 206 may train a machine learning model specifically for a given vehicle. Service recommendation module 206 may do so by using training data corresponding to a same vehicle (e.g., by using training data of vehicles having a commonality of one or more macro attributes such as make, model, and/or year). For example, service recommendation module 206 may train a machine learning model for a 2020 Toyota 4Runner by using training data for other Toyota 4Runners, or by using training data for just 2020 Toyota 4Runners. Alternatively or additionally, service recommendation module 206 may do so by using training data for similar vehicles. To identify similar vehicles, service recommendation module 206 may apply an unsupervised machine learning model (e.g., a clustering algorithm. A nearest neighbor search algorithm, and the like), and may identify based on the output of the unsupervised machine learning model training data having attributes sufficiently similar to the vehicle at issue (e.g., by clustering training data having similarities across a plurality of dimensions). In order to improve computational efficiency, in an embodiment, service recommendation module 206 may determine whether at least a threshold amount of training data is available for same vehicles. Responsive to determining that the threshold amount of training data is in fact available for same vehicles, service recommendation module 206 may use the same vehicle training data to train the model. Responsive to determining that the threshold amount of training data is not available for same vehicles, service recommendation module 206 may use the unsupervised machine learning model to obtain additional training data.

Using any aforementioned mechanism for generating and/or selecting a machine learning model, service recommendation module 206 applies the current vehicle data and the historical vehicle data to the machine learning model, and obtains as output from the machine learning model probabilities that each possible service is applicable to the vehicle. Service recommendation module 206 applies a threshold to the output, and possible services having a probability that exceeds the threshold are determined by service recommendation module 206 to be candidate services. Optionally, possible services are excluded from candidate services regardless of their probability where service recommendation module 206 determines that the entity performing the inspection does not provide a given service (e.g., the vehicle shop does not do glass work, so a windshield replacement recommendation is omitted).

In some scenarios, services may be more or less likely to be accepted by users having certain profile characteristics. A user with an occupation that is very time-intensive, for example, may be unlikely to accept vehicle services that require the vehicle to be under repair for a long amount of time. To this end, in some embodiments, service recommendation module 206 may use profile data of vehicle drivers in the training data, and may additionally input into the machine learning model profile information of the driver of the vehicle at issue. This additional information in the training data and in the inputs may influence the probabilities that a given possible service is surfaced.

User interface module 208 outputs to one or more of client devices 110 (e.g., of a vehicle owner and/or service technician) service recommendations identified service recommendation module 206, where the service recommendations are for display on a user interface of the client device(s) 110. In an embodiment, all service recommendations are indicated in the user interface. In some embodiments, the service recommendations are ranked and/or filtered.

Recommendations may be ranked on any number of objective features, such as severity of service (e.g., where high severity indicates that the vehicle will likely fail if the service recommendation is not accepted, and low severity indicates that the vehicle will likely not fail if the service recommendation is not accepted), cost of service, amount of time the service will take, and so on. User interface module 208 may rank using an optimization function, where certain features are prioritized over others. The prioritized features may be determined based on profile data of the vehicle driver. For example, the vehicle driver may expressly indicate that they prioritize cost over other aspects, and therefore optimizing for cost may be performed in ranking the features. As another example, user interface module 208 may determine what to optimize based on past user interactions. In an embodiment, user interface module 208 may determine that a user tends to decline certain types of service recommendations, and therefore may deprioritize a given service recommendation even if it has a high severity.

In an embodiment, user interface module 208 may rank the recommended services using a machine learning model. The model may be a supervised machine learning model trained using profile data of customers as paired to labels of service recommendations that are accepted and rejected. User interface module 208 may input the candidate services to the model along with the vehicle driver's profile information, and may receive as output from the model probabilities that each candidate service recommendation will be accepted. User interface module 208 may rank the recommended services according to the probabilities, and optionally may filter out candidate services that do not have at least a threshold probability of being accepted (e.g., a 10% probability).

In an embodiment, user interface module 208 may display selectable options in association with each recommended service that is offered. The selectable options may, when selected, indicate that a service is declined or accepted. User interface module 208 may store selections in vehicle driver profile database 216, and/or may store selections in association with user profile data and/or vehicle attribute data as training data in training data database 218. User interface module 208 may dynamically re-rank the recommended services responsive to receiving a selection of a selectable option and update the display with the re-ranked services.

For example, where a user indicates that they are not interested in changing brakes, associated changes such as replacing tires may be ranked lower.

User interface module 208 may, in addition to displaying recommended services, may also display options to configure the user interface and the information thereon. One of these options may be an option to insert a value (e.g., budget) associated with vehicle services. In response to receiving an indication that such a value has been input, user interface module 208 may optimize the recommended services by re-ranking to prioritize services that are most important and fit within the indicated value. Optionally, user interface module 208 may filter out services that do not fit within the indicated value and omit them from the user interface. Another of these options may be to filter out services having user-input attributes. For example, the user may input an indication that only services having at least a threshold severity should be recommended. User interface module 208 may automatically filter recommended services to exclude services not offered by the service provider that inspected the vehicle.

Figure 3A:
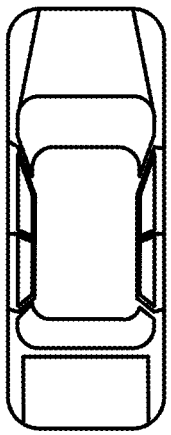
FIG. 3A illustrates one embodiment of a user interface inputting vehicle component data for use by the service recommendation system.

FIG. 3A illustrates one embodiment of a user interface inputting vehicle component data for use by the service recommendation system. User interface 310 may be displayed on any client device 110, such as a client device of a service technician. Field 312 may be used (e.g., using user interface module 208) to receive user input including information that relates to a customer and/or a vehicle. As illustrated, this may include a name of a customer, a make, model, and year of a car, and a date of service, though this is merely exemplary, and prompts for any information contemplated herein may be displayed, whereby corresponding information may be received via user input by user input interface module 208.

Field 314 may be used to receive status information for various components of a vehicle (e.g., vehicle 120). For example, user input interface module 208 may receive user interaction with field 314 that indicates a status of each listed component of field 314, and may register that status in association with that component. While check boxes are depicted showing that a given component has been inspected, this is merely exemplary, and any form of status may be used, such as a health of a given component (e.g., binary OK or no good tags, or more robust tags such as a level of wear of a given component).

Field 316 may be used to receive other sensory information, such as images and/or video of a vehicle. A user of client device 110 may select images and/or video for receipt by user input interface module 208. Service recommendation module 206 may process the images and/or video to determine component status of a vehicle. For example, one or more machine learning models may be trained using images as labeled by component conditions, and service recommendation module 206 may input the images into those machine learning model(s) to determine component status. As a specific example, an image may be input into a machine learning model and an output of the machine learning model may be that the exterior of the vehicle is scratched.

FIG. 3B illustrates one embodiment of a user interface that shows an output of the service recommendation system. User interface 320 shows service recommendations as output by service recommendation module 206 using user input interface module 208. User input interface module 208 may filter the displayed recommendations based on configurations input using filter option 322 in any manner discussed in the foregoing. Service recommendations 324 may include a name of a service, a severity of a service, a price of a service, a time for completion of a service, and any other information (though not depicted) relating to a service.

FIG. 3C illustrates one embodiment of a user interface shows a filtered output of the service recommendation system. User interface 330 is updated based on user input interface module 208 receiving a selection of inputs indicating filters from a user. The input filters are shown in filters 332, where a user has indicated a maximum budget and a maximum amount of time for completion of a given task. In an embodiment, filters may be applied that a user has not selected based on prior application usage in order to improve the user interface. For example, where a vehicle driver is a returning customer that has received services before, a filter may be automatically applied that filters out services that do not relate to returning customers (e.g., recommended services for a first visit).

FIG. 3D illustrates one embodiment of a user interface shows an icon selected from a filtered output of the service recommendation system. As shown in FIG. 3D, service recommendation 342 of an engine servicing is selected by a user. Though not depicted, as described in the foregoing, service recommendation module 206 may, responsive to detecting a selection of a service recommendation, re-rank the remaining service recommendations and update the display of the remaining service recommendations based on what is selected. Similarly, a user may reject a service by interacting with a service recommendation option (e.g., selecting an "x" icon displayed in visual association with a service recommendation), and service recommendation module 206 may re-rank the remaining services accordingly. This results in an improved user interface having icons organized based on application usage by a given user.

Figure 4:
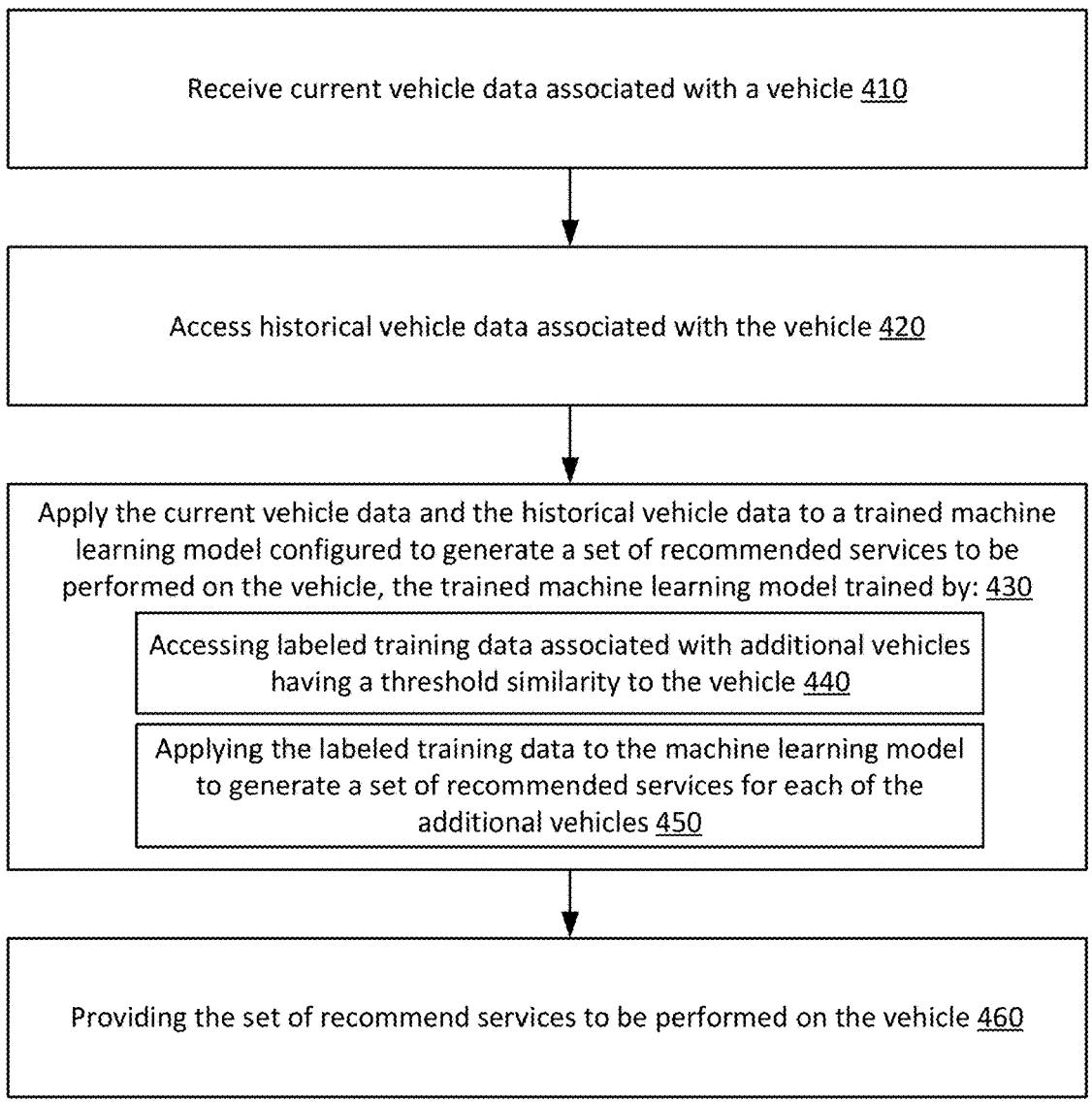
FIG. 4 illustrates an exemplary process for operating the service recommendation system, in accordance with one embodiment of the disclosure.

FIG. 4 illustrates an exemplary process for operating the service recommendation system, in accordance with one embodiment of the disclosure. Process 400 may be executed by a processor (e.g., processor 502) of service recommendation system 130. Process 400 may begin by service recommendation system 130 receiving 410 current vehicle data associated with a vehicle (e.g., using current vehicle data ingestion module 202 to ingest information about vehicle 120). Service recommendation system 130 may then access 420 historical vehicle data associated with the vehicle (e.g., using historical vehicle data module 204).

Service recommendation system 130 applies 430 the current vehicle data and the historical vehicle data to a trained machine learning model configured to generate a set of recommended services to be performed on the vehicle (e.g., using service recommendation module 206). The machine learning model may be trained by accessing 440 labeled training data associated with additional vehicles having a threshold similarity to the vehicle, and applying 450 the labeled training data to the machine learning model to generate a set of recommended services for each of the additional vehicles. Service recommendation system 130 provides 460 the set of recommended services to be performed on the vehicle (e.g., provides for display on client device 110 using user input interface module 208).

Computing Machine Architecture

Figure 5:
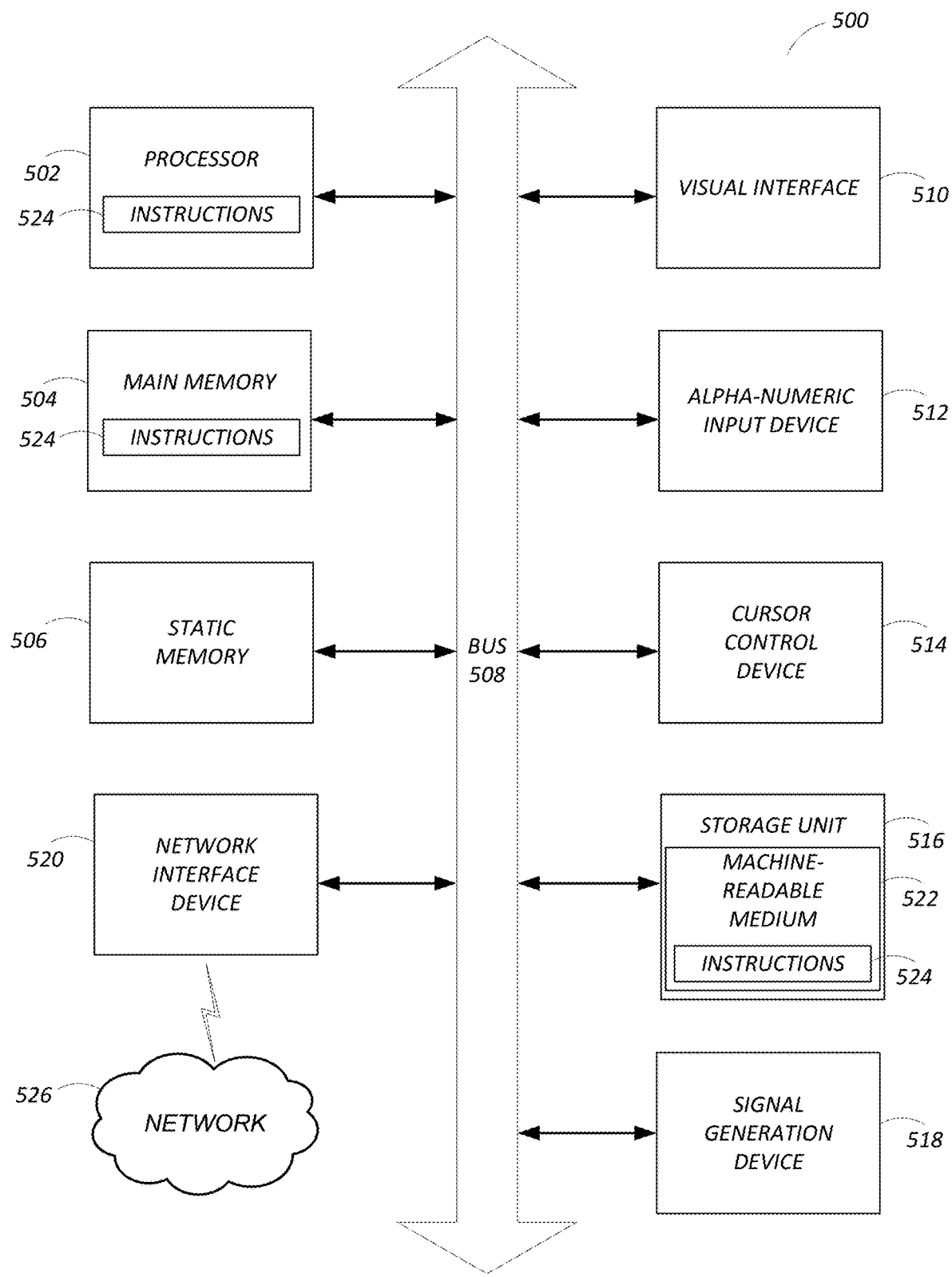
(FIG. 5 is a block diagram illustrating components of an example machine able to read instructions from a machine-readable medium and execute them in a processor (or controller).

FIG. (FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 524 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 500 includes one or more processors 502 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 504, and a static memory 506, which are configured to communicate with each other via a bus 508. The computer system 500 may further include visual display interface 510. The visual interface may include a software driver that enables (or provide) user interfaces to render on a screen either directly or indirectly. The visual interface 510 may interface with a touch enabled screen. The computer system 500 may also include input devices 512 (e.g., a keyboard a mouse), a storage unit 516, a signal generation device 518 (e.g., a microphone and/or speaker), and a network interface device 520, which also are configured to communicate via the bus 508.

The storage unit 516 includes a machine-readable medium 522 (e.g., magnetic disk or solid-state memory) on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

Upon reading this disclosure, those of skill in the art will appreciate still additional alternative structural and functional designs for a system and a process for enabling a service recommendation system to generate accurate recommendations through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving, by way of human input into a user interface relating to a vehicle inspection, current vehicle data describing a current state of each of a plurality of components of a vehicle;
responsive to receiving the current vehicle data, accessing historical vehicle data associated with the vehicle, the historical vehicle data describing a set of services previously performed on the vehicle;
accessing user profile data indicating one or more vehicle servicing preferences of an owner of the vehicle;
applying the current vehicle data, the historical vehicle data, and the one or more vehicle servicing preferences of the owner of the vehicle as input to a supervised machine learning model configured to generate a set of recommended services to be performed on the vehicle, wherein the supervised machine learning model was trained by:
responsive to determining that insufficient training data exists for a same vehicle type to the vehicle, determining a set of additional vehicles that have a threshold similarity to the vehicle by applying an unsupervised machine learning model to attributes of the vehicle and receiving as output from the unsupervised machine learning model an identification of each of the set of additional vehicles;
responsive to determining the set of additional vehicles that have the threshold similarity to the vehicle, accessing labeled training data corresponding to each additional vehicle of the set of additional vehicles, wherein each label of each training example of the labeled training data indicates a set of services performed on a respective additional vehicle, and
training the supervised machine learning model using the labeled training data, the supervised machine learning model trained to output a set of recommended services to be performed for a given vehicle based on inputs of given current vehicle data and given historical vehicle data for the given vehicle and the one or more vehicle servicing preferences of the owner of the vehicle, the one or more vehicle servicing preferences of the owner of the vehicle influencing whether a given service is included in the set of recommended service based on a likelihood that a person having that set of preferences would accept the given service; and
outputting for display the set of recommended services to be performed on the vehicle to a user.

2. The method of claim 1, further comprising:
ranking the set of recommended services to be performed on the vehicle;
providing for display selectable options, each selectable option associated with a recommended service in the set of recommended services;
determining that the user has interacted with a selectable option corresponding to a recommended service; and responsive to determining that the user has interacted with the selectable option:
  reranking a subset of the selectable options, and
  updating the ranking based on the reranking, the updated ranking output for display along with a selectable option for each of a subset of the selectable options.

3. The method of claim 1, further comprising:
generating for display to the user one or more interface elements, each of the one or more interface elements to allow a user to select one or more values associated with vehicle services;
in response to receiving an indication that a user interacted with at least one interface element of the one or more interface elements, optimizing the set of recommended services to be performed on the vehicle; and
updating the interface elements based on the optimized set of recommended services.

4. The method of claim 1, further comprising:
filtering the set of recommended services based on one or more of: a value entered by an owner of the vehicle, a severity of service of each of the recommended services in the set of recommended services, and a likelihood the owner of the vehicle will accept a recommended service, wherein providing the set of recommended services to be performed on the vehicle comprises providing the filtered set of recommended services for display.

5. The method of claim 1, further comprising:
determining a set of services a service provider has available to provide to vehicle owners; and
filtering the set of recommended services based on a set of services a service provider offers to vehicle owners.

6. The method of claim 1, wherein the labeled training data includes one or more of: historical inspection information of the additional vehicles, inspection values of the additional vehicles, services performed on the additional vehicles, and services declined by customers of the additional vehicles.

7. The method of claim 1, further comprising:
classifying the historical vehicle data into a plurality of predetermined service classifications, wherein the set of recommended services includes services corresponding to the predetermined service classifications.

8. The method of claim 1, wherein the current vehicle data includes inspection information provided by a technician of the vehicle.

9. The method of claim 1, further comprising: retraining the supervised machine learning model based on services of the set of recommended services that were accepted and declined by the user.

10. The method of claim 1, wherein receiving the current vehicle data comprises receiving data from one or more sensors of the vehicle.

11. The method of claim 10, wherein receiving the current vehicle data comprises receiving data from a computer of the vehicle, the computer operably coupled to the one or more sensors of the vehicle.

12. The method of claim 1, wherein receiving the current vehicle data comprises receiving data from a client device of a service technician.

13. A non-transitory computer-readable medium comprising memory with instructions encoded thereon that, when executed, cause one or more processors to perform operations, the instructions comprising instructions to:
receive, by way of human input into a user interface relating to a vehicle inspection, current vehicle data describing a current state of each of a plurality of components of a vehicle;
responsive to receiving the current vehicle data, access historical vehicle data associated with the vehicle, the historical vehicle data describing a set of services previously performed on the vehicle;
accessing user profile data indicating one or more vehicle servicing preferences of an owner of the vehicle;
apply the current vehicle data, the historical vehicle data, and the one or more vehicle servicing preferences of the owner of the vehicle as input to a supervised machine learning model configured to generate a set of recommended services to be performed on the vehicle, wherein the supervised machine learning model was trained by:
  responsive to determining that insufficient training data exists for a same vehicle type to the vehicle, determining a set of additional vehicles that have a threshold similarity to the vehicle by applying an unsupervised machine learning model to attributes of the vehicle and receiving as output from the unsupervised machine learning model an identification of each of the set of additional vehicles;
  responsive to determining the set of additional vehicles that have the threshold similarity to the vehicle, accessing labeled training data corresponding to each additional vehicle of the set of additional vehicles, wherein each label of each training example of the labeled training data indicates a set of services performed on a respective additional vehicle, and
  training the supervised machine learning model using the labeled training data, the supervised machine learning model trained to output a set of recommended services to be performed for a given vehicle based on inputs of given current vehicle data and given historical vehicle data for the given vehicle and the one or more vehicle servicing preferences of the owner of the vehicle, the one or more vehicle servicing preferences of the owner of the vehicle influencing whether a given service is included in the set of recommended service based on a likelihood that a person having that set of preferences would accept the given service; and
output for display the set of recommended services to be performed on the vehicle to a user.

14. The non-transitory computer-readable medium of claim 13, the instructions further comprising instructions to:
rank the set of recommended services to be performed on the vehicle;
provide for display selectable options, each selectable option associated with a recommended service in the set of recommended services;
determine that the user has interacted with a selectable option corresponding to a recommended service; and
responsive to determining that the user has interacted with the selectable option:
  re-rank a subset of the selectable options, and
  update the ranking based on the re-ranking, the updated ranking output for display along with a selectable option for each of a subset of the selectable options.

15. The non-transitory computer-readable medium of claim 13, the instructions further comprising instructions to:

generate for display to the user one or more interface elements, each of the one or more interface elements to allow a user to select one or more values associated with vehicle services;

in response to receiving an indication that a user interacted with at least one interface element of the one or more interface elements, optimize the set of recommended services to be performed on the vehicle; and update the interface elements based on the optimized set of recommended services.

16. The non-transitory computer-readable medium of claim 13, the instructions further comprising instructions to:

filter the set of recommended services based on one or more of: a value entered by an owner of the vehicle, a severity of service of each of the recommended services in the set of recommended services, and a likelihood the owner of the vehicle will accept a recommended service, wherein providing the set of recommended services to be performed on the vehicle comprises providing the filtered set of recommended services for display.

17. The non-transitory computer-readable medium of claim 13, the instructions further comprising instructions to:

determine a set of services a service provider has available to provide to vehicle owners; and filter the set of recommended services based on a set of services a service provider offers to vehicle owners.

18. The non-transitory computer-readable medium of claim 13, wherein the labeled training data includes one or more of: historical inspection information of the additional vehicles, inspection values of the additional vehicles, services performed on the additional vehicles, and services declined by customers of the additional vehicles.

19. The non-transitory computer-readable medium of claim 13, the instructions further comprising instructions to:

classify the historical vehicle data into a plurality of predetermined service classifications, wherein the set of recommended services includes services corresponding to the predetermined service classifications.

* * * * *